April 29, 1930.                G. W. TAYLOR                1,756,264
                                ROLLER BEARING
                           Filed Dec. 17, 1926          2 Sheets-Sheet 1
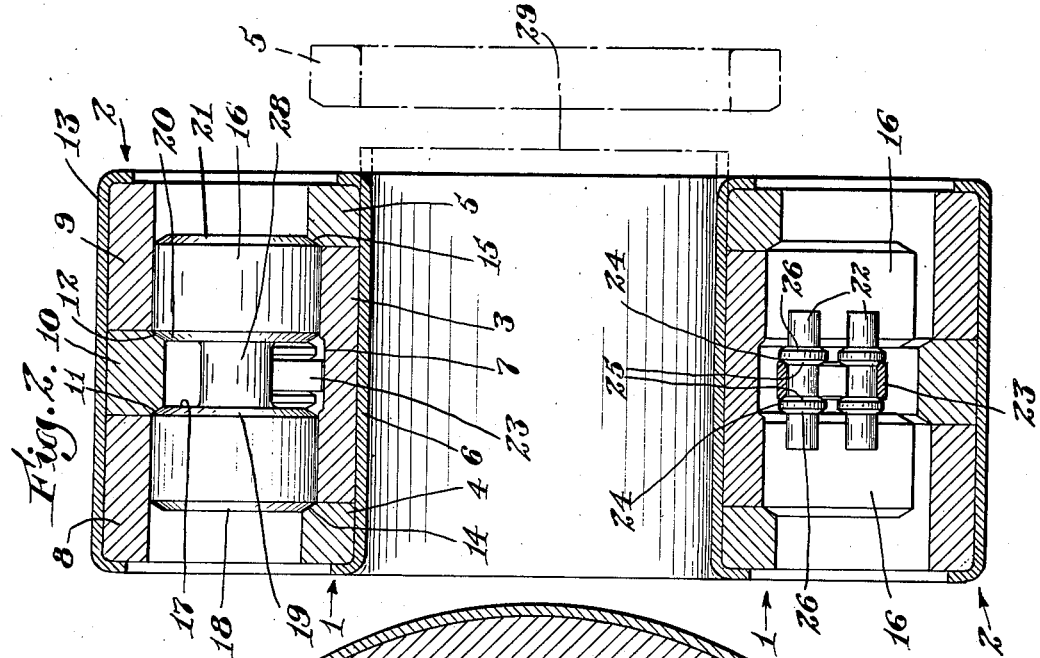
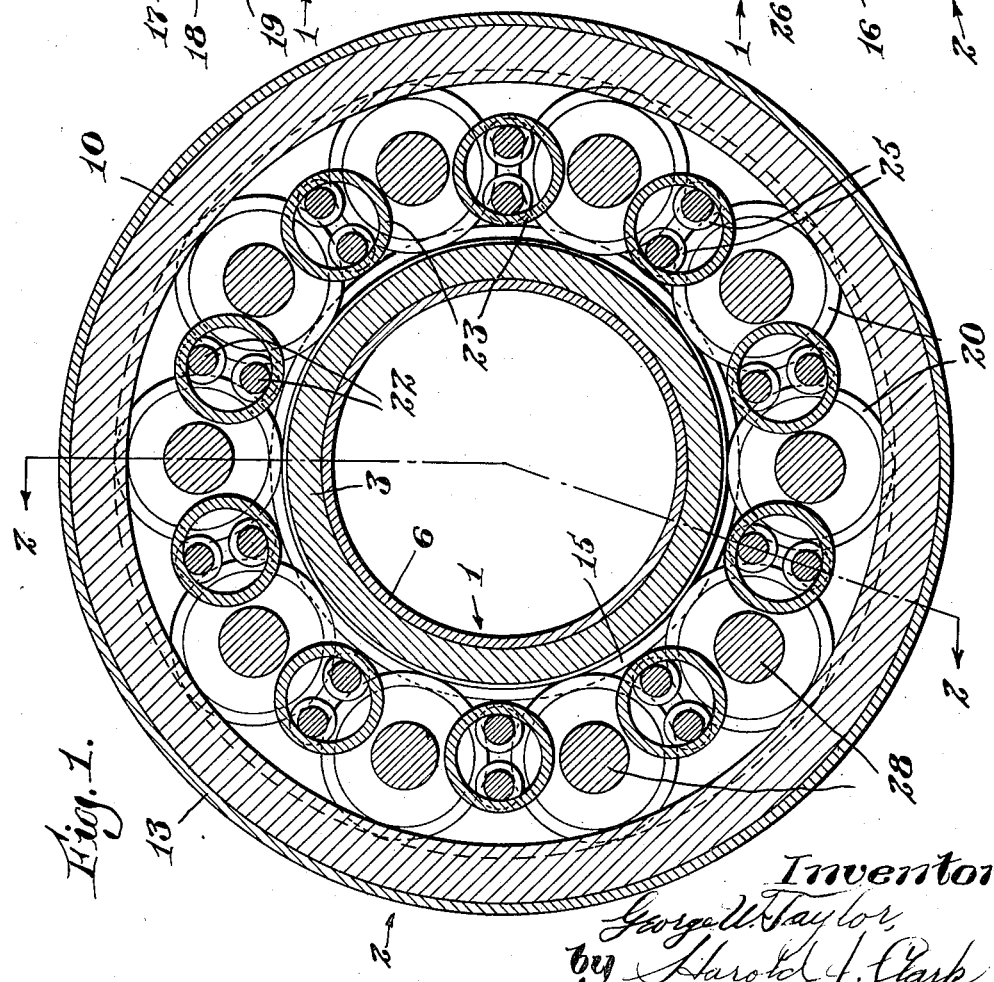
Inventor
George W. Taylor,
by Harold J. Clark
Attorney April 29, 1930.  G. W. TAYLOR  1,756,264
ROLLER BEARING
Filed Dec. 17, 1926    2 Sheets-Sheet 2
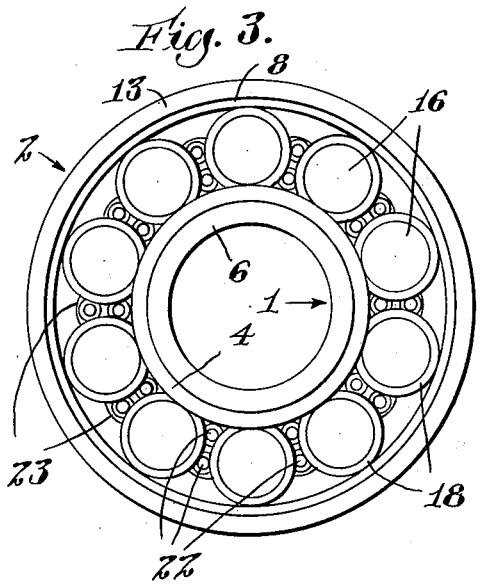
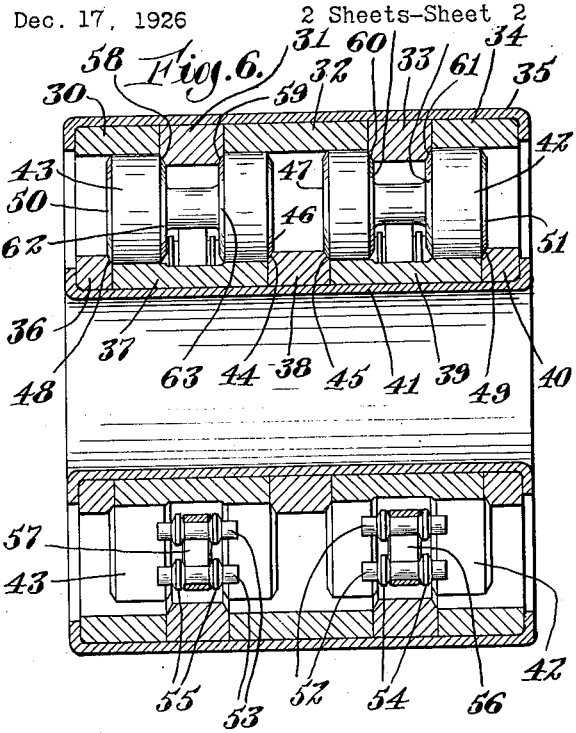
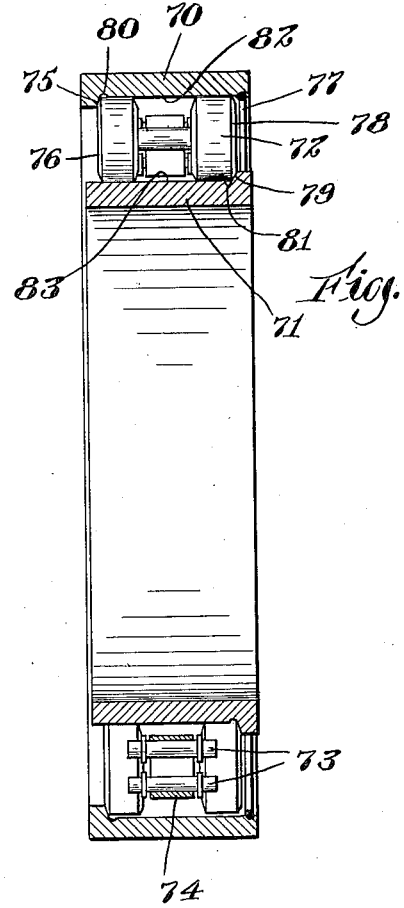
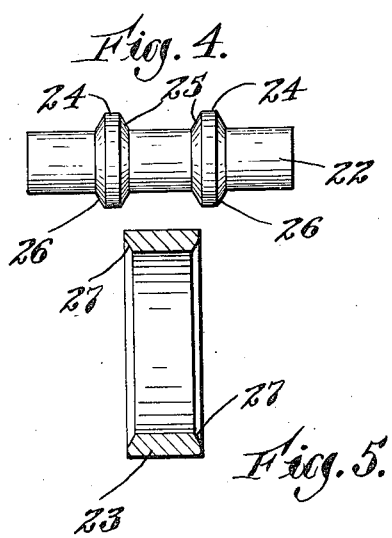
Inventor
George W. Taylor,
by Harold F. Clark.
Attorney Patented Apr. 29, 1930

1,756,264

UNITED STATES PATENT OFFICE

GEORGE W. TAYLOR, OF WELLESLEY, MASSACHUSETTS, ASSIGNOR, BY MESNE ASSIGN-MENTS, TO HAROLD J. CLARK, OF WATERTOWN, MASSACHUSETTS

ROLLER BEARING

Application filed December 17, 1926. Serial No. 155,390.

My present invention relates to bearings, and more particularly that type of bearing in which anti-friction rollers are utilized.

A principal object of the present invention is to provide a roller bearing which will reduce friction to a minimum, and which will be, at the same time, capable of sustaining heavy loads without likelihood of breakage, uneven wear, and misalinement.

My novel bearing may also be utilized as an anti-friction bearing for shafting, either in parallel line shafting or in connection with shafting which is subjected to end thrust.

A further feature of the present invention is the provision of a roller bearing which will be extremely strong and durable in its construction, and which, because of the reduction of friction within the bearing, will require substantially no attention, alteration or adjustment after having been once positioned.

Furthermore, I so construct my novel bearing that the wear on the component parts will be so slight as to render unnecessary any adjustment for end thrust, side thrust, or the like. This and other novel and important features will be hereinafter more fully described.

In carrying out my present novel invention of an anti-friction roller bearing, I utilize two concentric sleeves and between these sleeves are mounted a series of supporting rollers, each supporting roller having an annular groove located centrally thereof. This provides, on each supporting roller four edges, each of which is slightly chamfered or bevelled. Between each pair of supporting rollers is mounted or positioned a pair of separating rollers, each pair of which rollers are enclosed in a retaining ring, each of the retaining rings projecting into the annular groove in each of the supporting rollers adjacent thereto. On each of the separating rollers are provided a pair of annular ribs preferably bevelled upon their opposite sides, thus forming inner and outer bevelled shoulders. An annular ring in the outer sleeve, either formed as an integral part of said sleeve or as a separate unit, projects into the annular groove in each of the supporting rollers, said ring having bevelled shoulders throughout its entire inner periphery, against which the inner bevelled edges of the supporting rollers contact. This bevelled ring in the outer sleeve serves as a guiding means, and as means to prevent disalinement or disarrangement of the supporting rollers, as well as means to prevent end movement of said supporting rollers. A pair of bevelled shoulders is provided on the outer periphery of the inner sleeve, against which bevelled shoulders the outer bevelled edges of the supporting rollers bear. These bevelled shoulders on the inner sleeve also serve as guiding means, and as means to take up end thrust transmitted to the bearing. The faces of the supporting rollers bear directly against the faces of the inner and outer concentric sleeves. Thus I provide, in my novel bearing, substantially entirely rolling contact throughout all parts, which reduces friction to the lowest possible minimum.

I believe that an anti-friction roller bearing, such as above briefly described, is novel, and I have therefore claimed the same broadly herein.

I have also illustrated in the present case, a novel roller bearing utilizing double races and double series of supporting rollers, which is constructed substantially as above described, with slight variations, which will be hereinafter more fully pointed out, described, and claimed. I believe that this form of my bearing is also novel, and claims directed thereto are therefore included in the present application.

Further features of the invention, novel combinations of parts, and advantages, will be hereinafter more fully pointed out and claimed.

Referring to the drawings, illustrating preferred embodiments of my present invention:

Fig. 1 is a cross sectional view of my novel bearing;

Fig. 2 is a cross sectional view on the line 2—2 of Fig. 1;

Fig. 3 is an end elevation of the bearing of Figs. 1 and 2;

Fig. 4 is an enlarged view of one of the separating rollers;

Fig. 5 is an enlarged view of one of the enclosing rings for the separating rollers;

Fig. 6 is a cross sectional view illustrating a double bearing of the type described herein; and Fig. 7 is a cross sectional view of a further modification.

From an inspection of the drawings it will be appreciated that I have devised a bearing of very strong and rugged construction, of great simplicity of manufacture and assembly, and the same is described in detail as follows:

As shown in the drawings, illustrating various modifications, Figs. 1 to 5 are the preferred form of my novel bearing. As shown in these figures, I provide two concentric rings, designated generally as 1 for the inner ring and 2 for the outer ring, both these rings 1 and 2 forming the race in which the rollers of the bearing move. The inner sleeve 1 may be positioned on an axle, a shaft, or other support, or may be constructed and arranged to itself constitute the support. The inner sleeve 1 comprises a plurality of members or rings, 3, 4 and 5, united and secured in position in the completed bearing by an enclosing cap 6. The surfaces of these rings or members 3, 4 and 5, it will be appreciated, must be ground to a high finish, to permit free movement of the roller members thereover. To facilitate this grinding action, and reduce the time limit required, I slightly groove the ring 3 as illustrated at 7, which groove 7 may be only a rough finish, since no wear or contact comes on said groove.

The outer concentric sleeve 2 comprises rings 8 and 9, and positioned between these rings 8 and 9 is a further ring 10, projecting inwardly beyond the surfaces of the rings 8 and 9, and having the projecting edges bevelled, as illustrated at 11 and 12. These three rings 8, 9 and 10 are held in united position in the completed bearing by an enclosing cap 13. The ring 4 is bevelled as shown at 14, and the ring 5 is bevelled at 15.

A series of supporting rollers 16 are provided, each roller being formed with an annular groove 17, and each roller having four bevelled edges 18, 19, 20 and 21. Between each two supporting rollers are positioned or placed a pair of separating rollers 22 contained within an enclosing ring 23, and held in appropriate spaced relation by said ring, which ring projects into the annular groove 17 in the roller 16. A pair of annular ribs 24 is provided on each separating roller 22, these ribs being preferably bevelled or conical upon their opposite sides, thus forming inner bevelled shoulders 25 and outer bevelled shoulders 26. The inner bevelled shoulders 25 bear against corresponding bevelled surfaces 27 formed upon the inner edges of the rings 23, and thus keep said rings 23 out of contact with the bevelled inner edges of the supporting rolls 16. It will thus be seen that the double bevelled shoulders or ribs 24 prevent the separating rollers from moving longitudinally of the bearing relatively to the supporting rollers.

By forming the supporting rollers 16 as above described, a relatively thick and heavy connecting bar 28 is formed, of sufficient size and strength to take care of any strains or shocks imparted to the bearing. The preferred method of assembling my novel bearing shown in Figs. 1 and 2 is to assemble the outer sleeve 2 complete, viz., with the rings 8, 9 and 10 united by the enclosing cap 13. The supporting and separating rollers are then assembled on said outer sleeve, being held therein by their peculiar construction, and because of the relatively snug fitting of all the component parts. The supporting and separating rollers are assembled complete on the outer sleeve, with the exception of one set of separating rollers. All the rollers, as thus far assembled, are then spread, and the last pair of separating rollers in their ring, are sprung into place as a unit. This last unit results in a self-locking of all the supporting and separating rollers on the outer sleeves, and affords a self-contained annular unit. I believe that this method of assembling a roller bearing is novel, and I have therefore claimed the same broadly herein. The rings 3 and 4 are then assembled on the enclosing cap 1, with one end of the cap closed and the other open, as illustrated at 29 in Fig. 2. The inner concentric sleeve as thus far assembled is then inserted, whereupon the bevelled ring 5, illustrated in dotted lines in Fig. 2, is applied over the open end of the cap 1, and inserted in the sleeve until it assumes the position shown in full lines in Fig. 2, whereupon the open end of the cap 29 is forced over and clamped down, thus securely uniting and holding the rings 3, 4 and 5 in their assembled position. The bearing is now complete, and ready for use.

From an inspection of the drawings, and particularly Figs. 1 and 2, it will be readily apparent that I have devised an extremely efficient roller bearing, one capable of withstanding great shocks and strains, and one in which friction is reduced to a minimum, thereby increasing the efficiency as well as the life of the bearing. Assume for example a sudden end thrust to be transmitted to the bearing. From Fig. 2 it will be apparent that any such end thrust travels through but one third, approximately, of the length of the supporting rollers 16, viz, a thrust imparted from the right, viewing Fig. 2, would be taken up from the bevel 15 of the ring 5, through the right hand section of the roller 16, to the bevel 12 on the ring 10.

If a sudden shock is transmitted to the top of the bearing, such shock is taken up over the relatively broad bearing faces of the roller 16, and is sustained by two lines of thrust, viz, from the bevel 11 on the ring 10 to the bevel 14 on the ring 4, and from the bevel 12 on the ring 10 to the bevel 15 on the ring 5. Thus my novel bearing affords a great amount of weight and shock resistance, as well as having tremendous load carrying ability, without increasing the friction or pressure within the bearings. This is due to the fact that substantially every moving part of the bearing has a rolling contact, which, as is well known, presents the least resistance and friction. Each part of my novel bearing is designed and constructed to most efficiently carry out the functions performed by said parts. Also, by constructing my novel bearing with all rolling contacts, damage caused by heat is also reduced, and in fact is substantially eliminated, as my novel bearing constructed and arranged as above described, runs cool under all conditions. This, also, in practical use, is an important feature.

Referring now to Fig. 6, I have therein illustrated a roller bearing utilizing a plurality of series of the separating rolls. In this Fig. 6 the outer concentric sleeve is comprised of a plurality of rings 30, 31, 32, 33 and 34, all maintained in united and assembled position by an enclosing cap 35. An inner concentric sleeve is composed of a plurality of rings 36, 37, 38, 39 and 40, which are likewise held in united and assembled position by an enclosing cap 41. A double series of supporting rollers 42 and 43 are illustrated. The ring 38 has bevelled edges 44 and 45, and is so positioned that this ring projects between the rollers 42 and 43 and the bevels 44 and 45 contact with the bevels 46 and 47, respectively. This ring 38, therefore, performs the functions of a guide for these rollers 42 and 43, also means to prevent longitudinal displacement of said rollers, as well as means to assist in taking up end thrust transmitted to the bearing, and performs the further function of assisting in absorbing shocks transmitted to the top of bottom of said bearing.

The outer rings 36 and 40 in the inner concentric sleeve have bevels 48 and 49 respectively, which bear against the bevelled edges 50 and 51 of the rollers 43 and 42 respectively, these bevels 48 and 49 acting as guiding means, thrust sustaining means, and shock absorbing means. Separating rollers 52 and 53 are positioned between supporting rolls 42 and 43, in similar manner to that illustrated in Figs. 1 and 2, these separating rollers having bevelled ribs 54 and 55, and being contained within enclosing rings 56 and 57, all identically as described in Figs. 1 and 2. The rings 31 and 33 project into the grooves in the separating rollers similar to the ring 10 in Fig. 2, and these rings have bevels 58, 59, 60 and 61, bearing against the bevels 62, 63, 64, and 65 respectively. Thus rings 31 and 33 act as guiding means for the rollers 43 and 42, prevent longitudinal displacement of the same, prevent disalinement thereof, assist in sustaining end thrust, shocks, and the like, and the ring 38 serves as a guiding medium between the two rollers 42 and 43, further preventing disalinement and longitudinal displacement. These three rings 31, 33 and 38, thus serve at all times to keep the component parts of the bearing in perfect alinement, increasing the efficiency of this form of the bearing, which bearing presents an extremely sturdy and rugged construction, capable of long life and withstanding extreme shocks and blows, and necessitating no adjustment for wear due to end thrust. From an inspection of Fig. 6 it will be apparent that end thrust, from either end or side of the bearing, due to the number of surfaces by which said end thrust is sustained, is evenly distributed throughout the entire length and circumference of the bearing and is substantially dissipated thereby.

Each of the forms of bearing thus far described is believed to be novel, and claims thereto are included in the present application.

In assembling the bearing illustrated in Fig. 6, the rings 30, 31 and 32 are first assembled in the cap 35, one end of said cap being turned over. The supporting rolls 43 and separating rolls 53, rings 57, etc., are then assembled on said rings 30, 31 and 32. The rings 36 and 37, of the inner concentric sleeve, are then assembled in the cap 41, one end of said cap being closed. The inner concentric sleeve as thus far assembled is then inserted. Thereupon the ring 38 is inserted over the open end of the cap 41. Thereupon the rings 33, 34 and 39, with the supporting rollers 42, separating rollers 52, and rings 56, are then assembled as a separate unit and inserted into the thus far assembled bearing. Thereupon the ring 40 is inserted, and the open ends of the caps 35 and 41 turned down or closed, thus firmly clamping and uniting the bearing in assembled position, and ready for use.

In Fig. 7 I have illustrated a much simpler form of my present invention, which will be advantageous and efficient in certain lines of application. This form of my novel bearing comprises an outer concentric sleeve 70 and an inner concentric sleeve 71. Supporting rollers 72 and separating rollers 73 enclosed in rings 74 are utilized. The outer sleeve 70 has a bevelled protruding edge 75 on which the bevelled edge 76 of the rollers 72 roll. A split spring ring 77 is applied to the outer sleeve 70 in an appropriate peripheral groove, and said split ring is closely adjacent the bevelled edge 78 of the roller 72. Thus the supporting rollers 72 are held in the outer sleeve 70 against longitudinal displacement, by the bevelled protrusion 75 on one side and the split ring 77 on the other. The inner sleeve has a bevelled protrusion or projection 79 against which the bevelled edge 78 of the rollers 72 bears. Grooves 80 in the outer sleeve and 81 in the inner sleeve are provided, merely to facilitate grinding of the surfaces 82 and 83 of the outer and inner surface respectively. Thus in this form of my novel bearing end thrust is sustained from the bevel 79 on the inner sleeve to the bevel 75 on the outer sleeve through the entire extent of the rollers 72. Shocks or blows are likewise sustained through the entire extent of the rollers 72, instead of, as in the two forms above described, being distributed throughout but a third of the supporting rollers. While I have necessarily described my present invention somewhat in detail, it will be appreciated that I may vary the size, shape, and arrangement of parts within reasonable wide limits without departing from the spirit of the invention.

It will also be appreciated that the unit load on the bearing contacting faces is reduced at each point, due to the large number of bearing points and contacts provided in my novel bearings above described.

My invention is further described and defined in the form of claims as follows:—

1. In a roller bearing, inner and outer concentric sleeves, parallel opposed faces on said sleeves forming a race, a series of supporting rollers mounted between and rolling on the opposed bearing faces of said sleeves, each of said rollers having an annular groove therein, a pair of separating rollers between each pair of adjacent supporting rollers, a retaining ring extending around each of said pairs of separating rollers and projecting into said annular groove in each of said adjacent supporting rollers, and means on said outer sleeve cooperating with said annular grooves to prevent longitudinal displacement of said supporting rollers.

2. In a roller bearing, inner and outer concentric sleeves, parallel opposed faces on said sleeves forming a race, a series of supporting rollers mounted between and rolling on the opposed bearing faces of said sleeves, each of said rollers having an annular groove therein, a pair of separating rollers between each pair of adjacent supporting rollers, a retaining ring extending around each of said pairs of separating rollers and projecting into said annular groove in each of said adjacent supporting rollers, the edges of said supporting rollers at said grooves being bevelled and bevelled means on said outer sleeve cooperating with said bevelled edges to prevent longitudinal displacement of said supporting rollers.

3. In a roller bearing, inner and outer concentric sleeves, parallel opposed faces on said sleeves forming a race, a series of supporting rollers mounted between and rolling on the opposed bearing faces of said sleeves, each of said rollers having an annular groove therein, a pair of separating rollers between each pair of adjacent supporting rollers, a retaining ring extending around each of said pairs of separating rollers and projecting into said annular groove in each of said adjacent supporting rollers, and a rib in said outer sleeve projecting into said annular grooves to prevent longitudinal displacement of said supporting rollers, and retain the same in constant alinement.

4. In a roller bearing, inner and outer concentric sleeves, parallel opposed faces on said sleeves forming a race, a series of supporting rollers mounted between and rolling on the opposed bearing faces of said sleeves, each of said rollers having an annular groove therein, a pair of separating rollers between each pair of adjacent supporting rollers, a retaining ring extending around each of said pairs of separating rollers and projecting into said annular groove in each of said adjacent supporting rollers, the edges of said supporting rollers at said grooves being bevelled, and a bevelled rib in said outer sleeve cooperating with said bevelled edges to prevent longitudinal displacement of said supporting rollers, the beveled edges of said rib being of the same angle as the beveled edges of said rollers.

5. In a roller bearing, inner and outer concentric sleeves, parallel opposed faces on said sleeves forming a race, a series of supporting rollers rolling on the opposed bearing faces of said race, each of said rollers having an annular groove therein, a pair of separating rollers between each pair of adjacent supporting rollers, a retaining ring extending around each of said pairs of separating rollers and projecting into said annular groove in each of said adjacent supporting rollers, said supporting rollers being provided with a plurality of bevelled edges, a bevelled rib in said outer sleeve projecting into said annular grooves and cooperating with certain of said bevelled edges, and bevelled flanges on the inner sleeve cooperating with others of said beveled edges on the supporting rollers, said rib and said flanges retaining said supporting rollers in constant alinement and preventing longitudinal displacement thereof.

6. In a roller bearing, inner and outer concentric sleeves, parallel opposed faces on said sleeves forming a race, a series of rollers rolling on the opposed bearing faces of said race, each of said rollers having an annular groove therein, the edges of said rollers adjacent said grooves being beveled, a bevelled rib in said outer sleeve projecting into said annular grooves and cooperating with the bevelled edges of said rollers to retain said rollers in alinement and prevent longitudinal displacement thereof.

7. In a roller bearing, inner and outer concentric sleeves, parallel opposed faces of said sleeves forming a race, a series of rollers rolling on the opposed bearing faces of said race, each of said rollers having an annular groove therein, the edges of said rollers adjacent to said grooves and the outer edges thereof being beveled, a beveled rib in said outer sleeve projecting into said annular grooves and cooperating with the beveled edges at said grooves to retain said rollers in alinement and prevent longitudinal displacement thereof, and beveled guiding flanges on the inner sleeve cooperating with the outer beveled edges of said rollers, the angles of all said bevels being the same.

8. In a roller bearing, inner and outer concentric sleeves, parallel opposed faces on said sleeves forming a race, a series of rollers rolling on the opposed bearing faces of said race, each of said rollers having an annular groove therein, the edges of said rollers adjacent said grooves being beveled, a rib in one of said sleeves projecting into said annular grooves and having beveled edges corresponding to the bevelled edges of said rollers to retain said rollers in alinement and prevent longitudinal displacement thereof.

In testimony whereof, I have signed my name to this specification.

GEORGE W. TAYLOR.